(12) United States Patent
Dehais et al.

(10) Patent No.: US 10,428,955 B2
(45) Date of Patent: Oct. 1, 2019

(54) CONTAMINATION RESISTANT BUTTERFLY VALVE

(75) Inventors: John M. Dehais, Windsor, CT (US); Anthony Santiago, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 13/532,225

(22) Filed: Jun. 25, 2012

(65) Prior Publication Data

US 2013/0341548 A1   Dec. 26, 2013

(51) Int. Cl.
    *F16K 1/226* (2006.01)
    *F16K 1/22* (2006.01)

(52) U.S. Cl.
    CPC ............ *F16K 1/2261* (2013.01); *F16K 1/222* (2013.01)

(58) Field of Classification Search
    CPC ...... F16K 1/2263; F16K 1/226; F16K 1/2261; F16K 1/2266; F16K 3/22; F16K 3/243; F16K 5/06; F16K 5/0663; F16K 5/0668; F16K 5/0673; F16K 5/0678; F16K 1/2042; F16K 1/205; F16K 1/2057; F16K 1/2085; F16K 1/2092; F16K 1/228; F16K 1/2285; F16K 1/46; F16K 1/465; F16K 25/04
    USPC ............... 251/306, 308, 259, 314, 305, 307, 251/359–365, 316–317.01
See application file for complete search history.

(56) References Cited

U.S. PATENT DOCUMENTS

| | | | | |
|---|---|---|---|---|
| 3,556,475 A | * | 1/1971 | Olenik ................. | F16K 1/2261 251/306 |
| 3,558,097 A | * | 1/1971 | DeFrees ................ | F16K 1/46 137/271 |
| 3,575,431 A | * | 4/1971 | Bryant .................. | F16K 3/0227 251/315.01 |
| 3,642,248 A | * | 2/1972 | Benware ............... | 251/172 |
| 4,083,529 A | * | 4/1978 | Santy ................... | F16J 15/32 251/173 |
| 4,192,484 A | * | 3/1980 | Scaramucci .......... | F16K 1/2285 251/173 |
| 4,258,901 A | * | 3/1981 | Zinnai ................. | F16K 1/2266 251/173 |

(Continued)

FOREIGN PATENT DOCUMENTS

| | | |
|---|---|---|
| CA | 2813972 A1 | 12/2013 |
| EP | 0310521 A1 | 6/1992 |

(Continued)

OTHER PUBLICATIONS

Canadian Office Action for application CA 2,813,972, dated Apr. 25, 2014, 4 pages.

(Continued)

*Primary Examiner* — Reinaldo Sanchez-Medina
*Assistant Examiner* — Hailey K. Do
(74) *Attorney, Agent, or Firm* — Cantor Colburn LLP

(57) ABSTRACT

A butterfly valve assembly for use in a fluid flow containing particles of debris is provided including a valve element. The valve element has a seal groove that extends about a periphery and defines an upstream side and a downstream side of the valve element. A seal is disposed within the seal groove. A clearance exists between the seal and an edge of the seal groove. Also, a relief is formed in either the valve element or the seal. The particles of debris accumulate in the relief and not the clearance.

5 Claims, 6 Drawing Sheets

(56) References Cited

U.S. PATENT DOCUMENTS

| | | | |
|---|---|---|---|
| 4,266,752 A | | 5/1981 | Johnson |
| 4,372,530 A | * | 2/1983 | Livorsi .................. 251/173 |
| 4,378,104 A | * | 3/1983 | Ben-Ur .................. 251/173 |
| 4,836,500 A | * | 6/1989 | Pupillo et al. .............. 251/306 |
| 4,892,287 A | * | 1/1990 | Weevers ............ F16J 15/32 |
| | | | 251/172 |
| 5,295,659 A | | 3/1994 | Steele |
| 6,837,483 B2 | * | 1/2005 | Wu .................. F16K 3/0227 |
| | | | 251/314 |
| 6,840,502 B2 | * | 1/2005 | Haushaelter ........ F16K 1/2263 |
| | | | 251/173 |
| 7,282,097 B2 | * | 10/2007 | Tanase .............. F16K 1/2261 |
| | | | 118/719 |
| 7,866,669 B2 | * | 1/2011 | Kobayashi .......... F16J 15/062 |
| | | | 277/584 |
| 8,623,145 B2 | * | 1/2014 | Bowman ............ F16J 15/062 |
| | | | 118/733 |
| 2005/0029483 A1 | * | 2/2005 | Bancroft et al. ............. 251/306 |
| 2009/0020099 A1 | | 1/2009 | Bessho et al. |
| 2012/0025118 A1 | | 2/2012 | LaBenz et al. |

FOREIGN PATENT DOCUMENTS

| | | | | |
|---|---|---|---|---|
| GB | 1197964 A | * | 7/1970 | ........ F16K 1/226 |
| JP | 58113666 | | 6/1983 | |

OTHER PUBLICATIONS

Canadian Office Action for application CA 2,813,972, dated Jan. 23, 2015, 4 pages.

\* cited by examiner

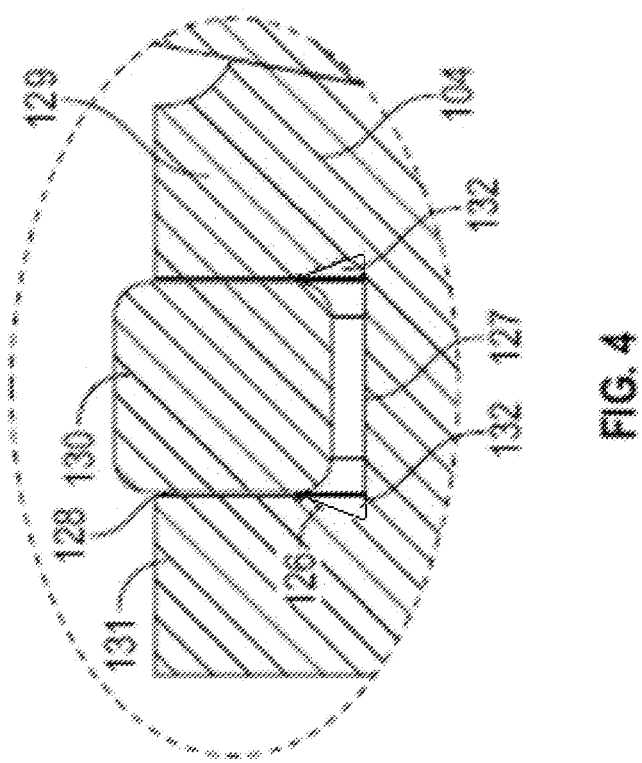

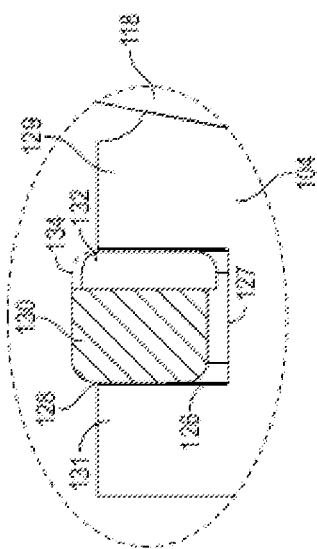
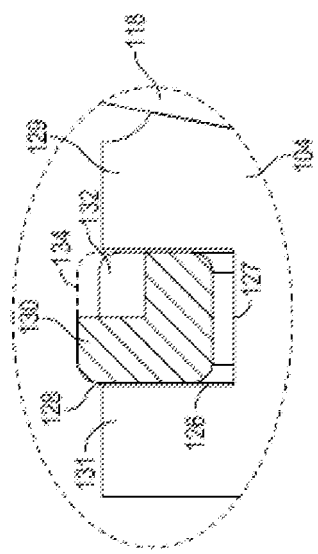
FIG. 5
FIG. 6

CONTAMINATION RESISTANT BUTTERFLY VALVE

BACKGROUND OF THE INVENTION

Exemplary embodiments of the invention relate generally to a butterfly valve for use within a fluid flow passageway and, more particularly, to a butterfly valve configuration that reduces the amount of contamination trapped between a seal and a groove of the butterfly valve.

Conventional butterfly valves customarily include a rotatable valve element, such as a disc for example, which includes a seal. The valve element is mounted within a fluid flow within, for example, a conduit. The seal should provide an effective seal around the periphery of the valve element while still allowing the valve element to easily rotate between an open and closed position. During operation, fluid flowing through the butterfly valve may be contaminated with debris. For example, if the valve assembly is disposed on an aircraft, the conduit may conduct hot air (e.g. upwards of 1000 to 1200 degrees Fahrenheit) that carries dirt, sand, and/or other granulated debris. This debris gradually accumulates around the periphery of the valve element within the groove housing the seal. If too many particles collect within the groove, the seal is hindered from functioning properly.

BRIEF DESCRIPTION OF THE INVENTION

According to one embodiment of the invention, a butterfly valve assembly for use in a fluid flow containing particles of debris is provided including a valve element. The valve element has a seal groove that extends about a periphery and defines an upstream side and a downstream side of the valve element. A seal is disposed within the seal groove. A clearance exists between the seal and an edge of the seal groove. Also, a relief is formed in either the valve element or the seal. The particles of debris accumulate in the relief and not the clearance.

BRIEF DESCRIPTION OF THE DRAWINGS

The subject matter, which is regarded as the invention, is particularly pointed out and distinctly claimed in the claims at the conclusion of the specification.

The foregoing and other features, and advantages of the invention are apparent from the following detailed description taken in conjunction with the accompanying drawings in which:

FIG. 3 is a cross-section of an butterfly valve assembly according to an embodiment of the invention;

FIG. 4 is a detailed cross-section of a portion of butterfly valve assembly according to an embodiment of the invention;

FIG. 5 is a detailed cross-section of a portion of butterfly valve assembly according to an embodiment of the invention;

FIG. 6 is a detailed cross-section of a portion of butterfly valve assembly according to an embodiment of the invention;

The detailed description explains embodiments of the invention, together with advantages and features, by way of example with reference to the drawings.

DETAILED DESCRIPTION OF THE INVENTION

Figure 1:
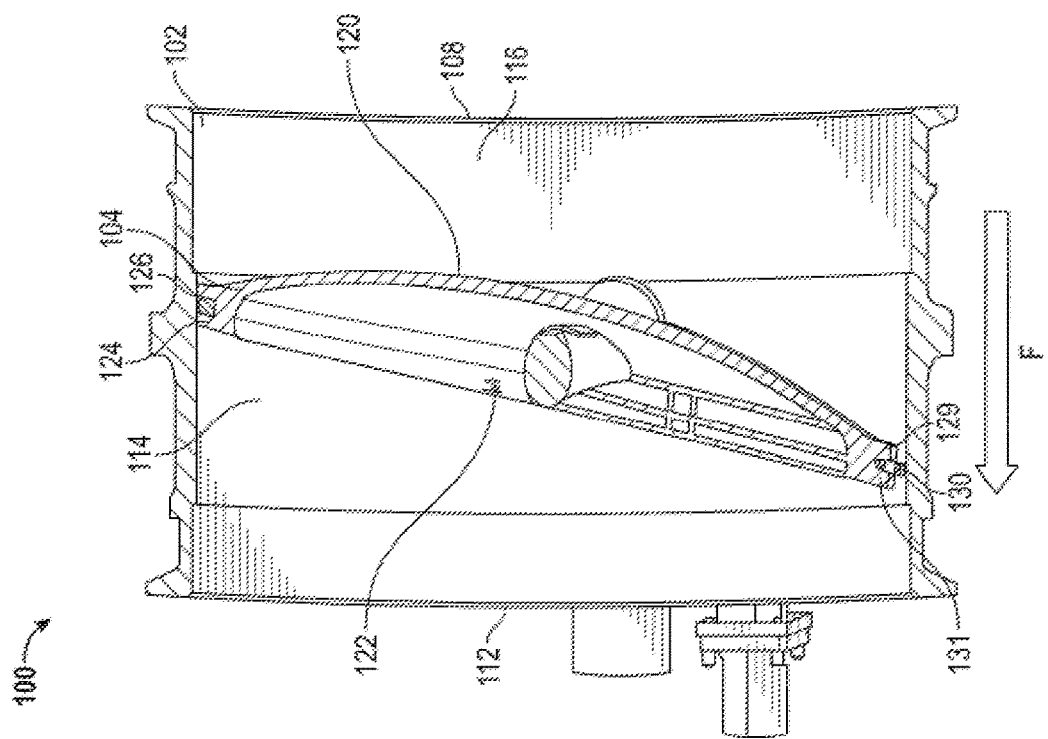
FIG. 1 is a cross-section of an exemplary butterfly valve assembly.

Referring now to FIG. 1, an exemplary butterfly valve assembly 100 is illustrated. The butterfly valve assembly 100 includes a tubular valve body 102 and a valve element 104. The valve body 102 includes an inlet port 108 and an outlet port 112 and an inner surface 114 that defines a flow channel 116. When the butterfly valve assembly 100 is installed in a fluid system (not shown), fluid selectively flows, in the direction indicated by arrow F, into the inlet port 108, through the flow channel 116, and out the outlet port 112. The capability for fluid to flow into and through the valve body 102 will depend, as may be appreciated, upon the position of the valve element 104. The valve element 104 is generally "disc" shaped and includes a first side 120, a second side 122, and an outer periphery 124. A seal groove 126 is formed about the outer periphery 124 of the valve element 104. The seal groove 126 defines an upstream side 129 and a downstream side 131 of the valve element 104. A seal 130 extends around the outer periphery 124 of the valve element 104 within the seal groove 126. The seal 130 may be formed from any one of numerous types of materials. In one embodiment, the seal 130 has a rectangular cross-section.

Figure 2:
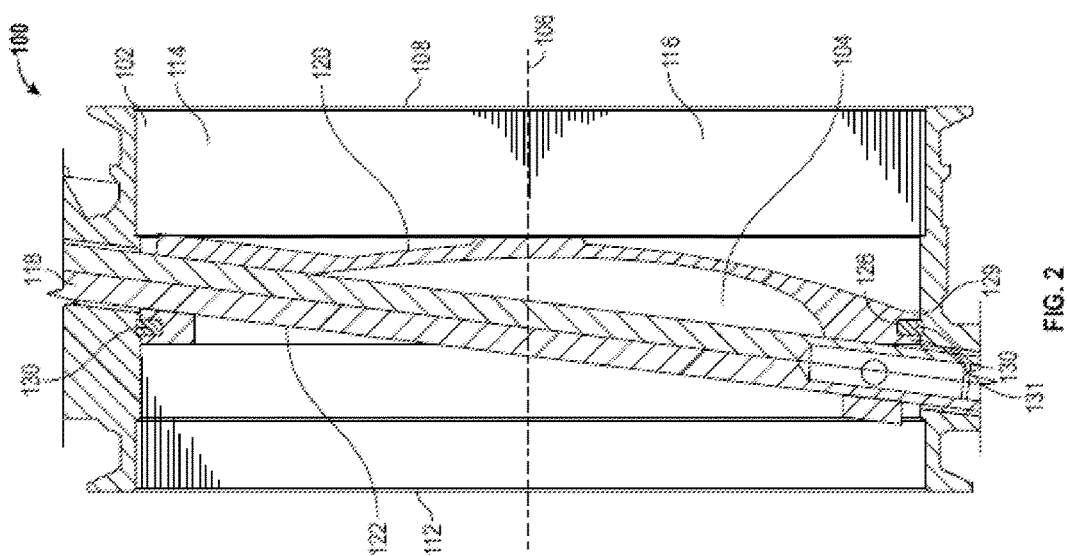
FIG. 2 is a cross-section of an exemplary butterfly valve assembly.

The valve element 104 is disposed within the flow channel 116 and is coupled to a shaft 118 (shown at least in FIG. 2). The shaft 118 is rotationally mounted to the valve body 102 via, for example, at least one bearing (not shown) and extends across the flow channel 116. The shaft 118 extends through a shaft opening (not shown) in the valve element 104 and across the flow channel 116 in a direction substantially perpendicular to a central axis 106 (FIG. 2). The valve element 104 is, thus, coupled to the shaft 118 for rotation between a closed position (see FIGS. 1 and 2) and an open position. When in the closed position, fluid flow through the flow channel 116 is at least substantially prevented. Conversely, when the valve element 104 is rotated approximately 90 degrees to a fully open position, fluid flow through the flow channel 116 is substantially unrestricted. The fluid flow rate through the valve body 102 may be controlled by rotating the valve element 104 to adjust the position of the valve element 104 with respect to the flow channel 116.

A clearance 128 (best seen in FIG. 4) exists between the seal 130 and at least one of the upstream side 129 or the downstream side 131 of the valve element 104 within the seal groove 126 so that the seal 130 may expand and contract based on temperature. Because the seal 130 and the valve element 104 are constructed of different materials, having different thermal expansion coefficients, the seal 130 expands and contracts at a different rate than the valve element 104. Small particles of debris (not shown) may become embedded in this clearance 128 and can impede the operation of the butterfly valve assembly 100. By increasing the size of a portion of the clearance 128, or an area adjacent the clearance 128, the debris particles will become trapped in the larger portion of the clearance 128, rather than the smaller portion. In one embodiment, illustrated in FIGS. 3 and 4, the seal groove 126 includes at least one relief 132 that is formed by removing a portion of the valve element 104 along a radial axis of the valve element 104. The seal groove 126 may include a relief 132 positioned adjacent both the upstream side 129 and the downstream side 131 of the valve element 104. In one embodiment, the relief 132 is generally triangular in shape and is located near the bottom edge 127 of the seal groove 126. In addition, the relief 132 may extend around the periphery 124 of valve element 104 within the seal groove 126. Any particles of debris trapped in the clearance 128 will migrate into the space created by the relief 132, out of interference with the operation of the butterfly valve assembly 100.

Figure 8:
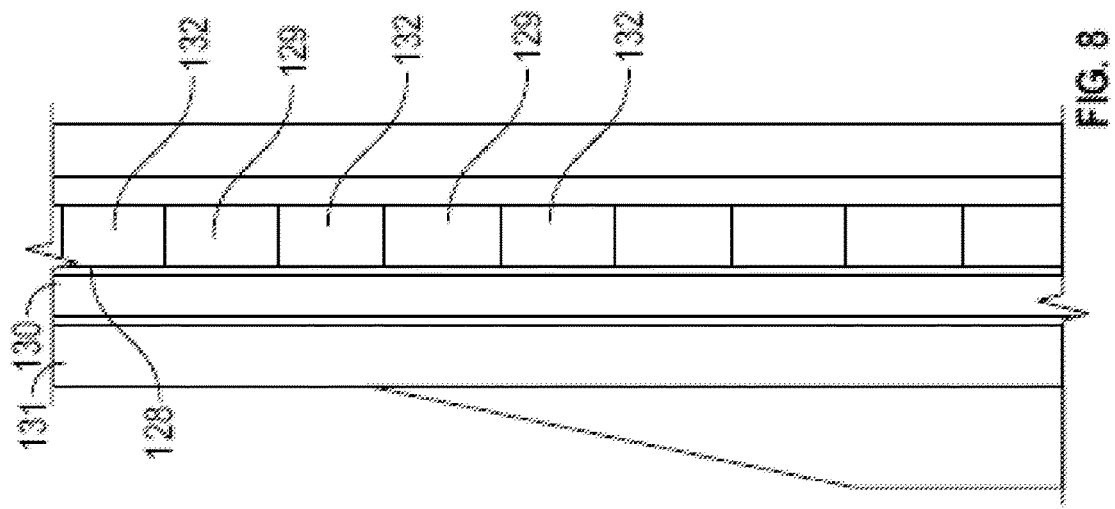
FIG. 8 is a cross-section of a portion of butterfly valve assembly according to an embodiment of the invention.
Figure 7:
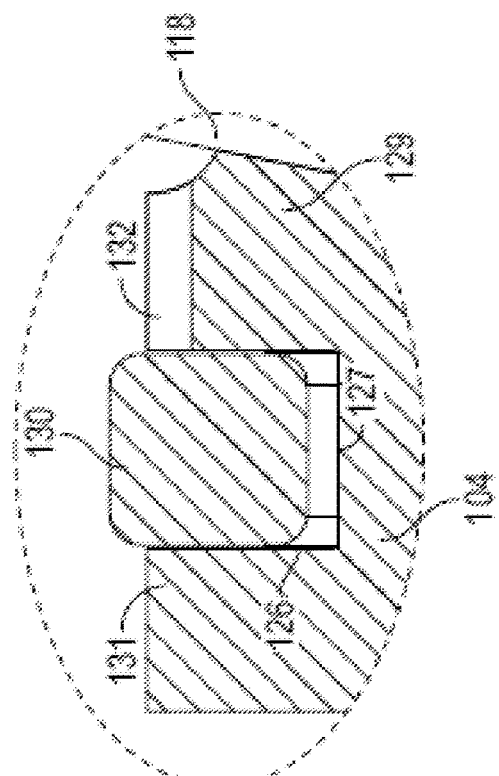
FIG. 7 is a detailed cross-section of a portion of butterfly valve assembly according to an embodiment of the invention.
Figure 10:
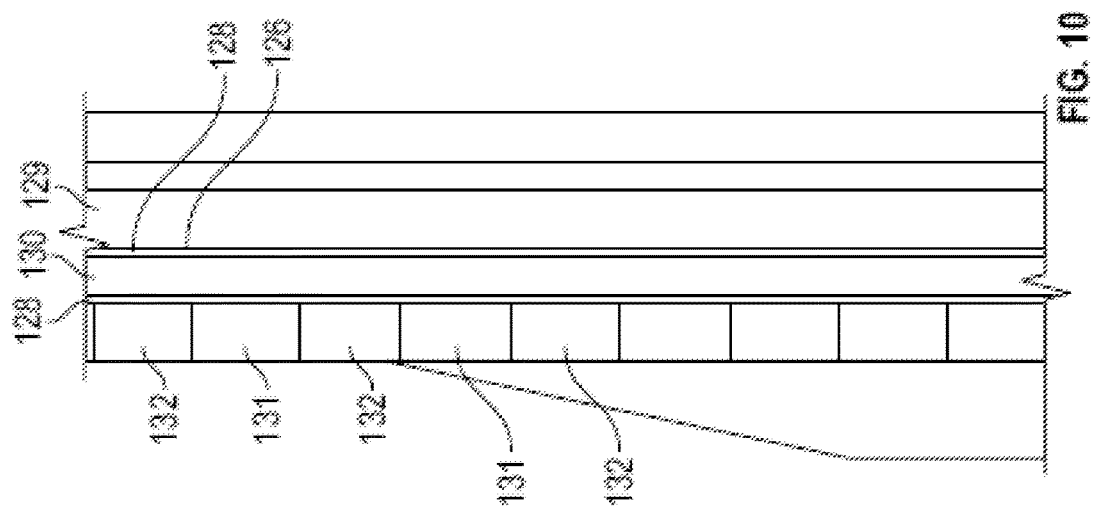
FIG. 10 is a cross-section of a portion of butterfly valve assembly according to an embodiment of the invention.
Figure 9:
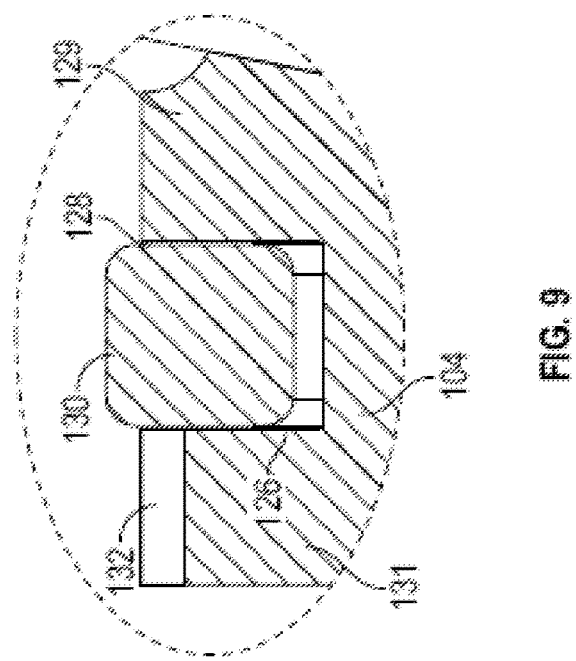
FIG. 9 is a detailed cross-section of a portion of butterfly valve assembly according to an embodiment of the invention.

FIGS. 5 and 6 show other examples of a butterfly valve assembly 100 having an increased clearance 128. In one embodiment, a relief 132 is formed in the seal 130 by removing a portion 134 of the seal 130 adjacent the upstream side 129 of the valve element 104. In the embodiment illustrated in FIG. 5, the relief 132 extends over the entire height of the seal 130. In another embodiment, shown in FIG. 6, the removed portion 134 extends over only a portion of the height of the seal 130, for example half the height. In embodiments where the relief 132 extends over only part of the height of the seal 130, the portion 134 is removed from adjacent the periphery 124 of the valve element 104. The relief 132, adjacent the upstream side 131 of the valve element 104, may extend around the entire circumference of the seal 130. Alternatively, a plurality of reliefs 132 may be formed at intervals disposed around the circumference of the seal 130. By forming a relief 132 in the seal 130 adjacent the upstream side 129, the contact area where debris particles may become trapped is minimized In yet another embodiment, a portion 140 of the valve element 104 adjacent the outer periphery 124 may be removed to form a relief 132. The relief 132 may be located on either the upstream side 129 of the valve element 104, as shown in FIGS. 7 and 8, or alternately, may be formed in the downstream side 131 of valve element 104, as shown in FIGS. 9 and 10. A relief 132 in the upstream side 129 of the valve element 104 may extend from the seal groove 126 up to the first side 120 of the valve element 104. Similarly, a relief 132 formed in the downstream side 131 of the valve element 104 may extend from adjacent the seal groove 126 up to the second end 122. The height of the relief on the upstream side 129 may be a portion of the height of the seal 130, or alternately, may extend over the full length of the seal 130. The height of a relief 132 formed on the downstream side 131 may be only a portion of the height of the seal 130. In one embodiment, multiple reliefs 132 are disposed at intervals about the periphery 124 of the valve element 104. When the butterfly valve assembly 100 is closed, pressure from the fluid in the flow channel 116 applies a force to the seal 130, positioning the seal adjacent the downstream side 131 of the valve element 104 within the seal groove 126. By creating too large of a relief 132 in the downstream side 131, the effectiveness of the seal 130 may be compromised.

Forming a relief 132 in the butterfly valve element 104 prevents particles of debris from accumulating in the small clearance 128 between the seal 130 and either the upstream or downstream side 129, 131 within the seal groove 126. The added reliefs 132 prevent debris particles from entering the clearance 128 and allow the particles of debris to freely move from the clearance 128. Due to varying contact of the seal 130 within the inner surface 114 as the valve element 104 is rotated within the butterfly valve assembly 100, the seal 130 migrates circumferentially relative to the seal groove 126. The rotation of the butterfly valve assembly 100 between an open and closed position provides the necessary motion for the debris particles to migrate from the clearance 128. By limiting the amount of debris particles within the clearance 128, jamming and binding of the seal 130 and valve element 104 are reduced, thereby increasing the service life and durability of the butterfly valve assembly 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A butterfly valve assembly for use in a fluid flow containing particles of debris comprising:
   a valve body;
   a valve element disposed in the valve body and configured to be rotatable in the valve body via a shaft, the valve element including a seal groove that extends about a periphery and defines an upstream side and a downstream side of the valve element, the seal groove including:
   an upstream face;
   a downstream face opposite the upstream face and parallel thereto, the upstream face and the downstream face defining a first seal groove width; and
   a base face defining a seal groove depth;
   a seal disposed within the seal groove such that a clearance exists between the seal and the upstream face and/or the downstream face, the seal having a rectangular cross-section, and shape and size substantially equal to the seal groove, the seal extending from the seal groove to an inner radial surface of the valve body and contacting the inner radial surface;
   a first relief formed in the seal groove at an intersection of the upstream face and the base face, the upstream face parallel to the downstream face from the outer periphery to the first relief; and
   a second relief formed in the seal groove at an intersection of the downstream face and the base face, the first relief and second relief being positioned such that a second seal groove width at the base face is greater than the first seal groove width at any other seal groove location such that the particles of debris accumulate in the first relief and/or the second relief and not the clearance.

2. The butterfly valve assembly according to claim 1, wherein the first relief and the second relief are formed in the valve element adjacent an edge of the seal groove.

3. The butterfly valve assembly according to claim 2, wherein the first relief and the second relief are generally triangular in shape.

4. The butterfly valve assembly according to claim 2, wherein the first relief and the second relief extend about the periphery of the valve element, within the seal groove.

5. The butterfly valve assembly according to claim 1, wherein the first relief and the second relief are formed by removing a portion of the valve element.

\* \* \* \* \*